(12) United States Patent
Vogman

(10) Patent No.: US 6,704,211 B1
(45) Date of Patent: Mar. 9, 2004

(54) DC-TO-DC CONVERTER

(75) Inventor: Viktor D. Vogman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 444 days.

(21) Appl. No.: 09/289,420

(22) Filed: Apr. 9, 1999

(51) Int. Cl.[7] .............................................. H02M 3/335
(52) U.S. Cl. .......................................... 363/20; 363/95
(58) Field of Search .............................. 363/20, 21, 78, 363/95, 131

(56) References Cited

U.S. PATENT DOCUMENTS

| | | | |
|---|---|---|---|
| 4,268,898 A | | 5/1981 | Brown |
| 4,274,133 A | | 6/1981 | Cuk et al. |
| 5,379,206 A | * | 1/1995 | Davidson ............... 363/55 |
| 5,621,625 A | * | 4/1997 | Bang ...................... 363/21 |
| 5,724,236 A | * | 3/1998 | Oglesbee ................ 363/40 |
| 5,835,368 A | * | 11/1998 | Yasumura .............. 363/89 |
| 5,930,124 A | * | 7/1999 | Otake ..................... 363/21 |

OTHER PUBLICATIONS

Abraham I, Pressman, "Switching Power Supply Design", International Editions 1992, pp. 236–243.

Jim Wang, William G. Dunford, Konrad Mauch, "Modified Boost Converter with Continuous Inductor Current Mode and Ripple Free Input Current", Jul. 1996, IEEE, pp. 390–396.

* cited by examiner

Primary Examiner—Adolf D. Berhane
(74) Attorney, Agent, or Firm—Paul E. Steiner

(57) ABSTRACT

A DC-to-DC converter having an input voltage and an output voltage, which includes a circuit topology such that, in operation, the input and output voltages have the same polarity, and that a magnitude of a ratio of the input voltage to the output voltage of the DC-to-DC converter is capable of being equal to, greater than, or less than one. The circuit topology is also such that a same at least one capacitor and alternative coils of a two-coil inductor are employed in a primary and a secondary circuit loop of the DC-to-DC converter. The primary and secondary circuit loops are not electrically isolated.

25 Claims, 3 Drawing Sheets

DC-TO-DC CONVERTER

BACKGROUND

1. Field

The present invention relates to DC-to-DC converters.

2. Background Information

DC-to-DC converters provide the capability to convert energy supplied by a power supply from one voltage and current level to another voltage and current level. Such circuits are widely employed in conjunction with computing platforms, such as personal computers, server nodes, laptop computers, and a variety of other computing systems. Such circuits are desirable because specifications for a processor typically employ lower voltages, such as 1½ to 2½ volts, and higher currents, such as reaching 50 to over 60 amps, that may change over a relatively wide range with a relatively high slew rate.

DC-to-DC converters are desirable for providing voltage regulation under these conditions for a variety of reasons. One reason is because such circuitry may be placed relatively close to the board components, resulting in the capability to provide low local voltage tolerances due to higher switching frequencies, single output topology, and a reduction in resistance from shorter electrical connections. State of the art topologies for DC-to-DC converters are typically energy efficient, reliable and cost effective when input voltages and output voltages have relatively close levels. However, maintaining efficiency in an environment employing a comparatively low voltage is typically costly due at least in part to the high currents employed to maintain the same amount of power while supplying a relatively low voltage. Likewise, isolation high frequency transformers may be employed, however, such transformers are also relatively expensive. A need, therefore, exists for a DC-to-DC converter that addresses cost efficiency while having the capability to convert over a range of voltages and/or currents.

SUMMARY

Briefly, in accordance with one embodiment of the invention, a DC-to-DC converter having an input voltage and an output voltage, includes: a circuit topology such that, in operation, the input and output voltages have the same polarity, and that a magnitude of a ratio of the input voltage to the output voltage of the DC-to-DC converter is capable of being equal to, greater than, or less than one. The circuit topology is also such that a same at least one capacitor and alternative coils of a two-coil inductor are employed in a primary and a secondary circuit loop of the DC-to-DC converter. The primary and secondary circuit loops are not electrically isolated.

Briefly, in accordance with another embodiment of the invention, a circuit for converting from an input direct current (DC) voltage, $V_{IN}$, to an output direct current (DC) voltage, $V_O$, where $V_O$ and $V_{IN}$ have the same polarity, includes: an inductor coupled so as to have a primary loop circuit and a secondary loop circuit that respectively conduct current at different times during circuit operation. The primary and secondary loop circuits are not electrically isolated. The primary loop and secondary loop circuits are further coupled so that, during circuit operation, while the inductor is charging via current flow in the primary loop circuit, the voltage across the coils of the inductor is $V_{IN}$, and while the inductor is discharging via current flow in the secondary loop circuit, the voltage across the coils of the inductor is $V_O$.

Briefly, in accordance with still another embodiment of the invention, a method of converting from an input direct current (DC) voltage, $V_{IN}$, to an output direct current (DC) voltage, $V_O$, where $V_{IN}$ and $V_O$ have the same polarity, includes the following. Current is conducted through a primary and a secondary loop circuit at different times so as to charge and discharge an inductor, included in both circuit loops. While the inductor charges the voltage across its coils is $V_{IN}$, and while the inductor discharges the voltage across its coils is $V_O$.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

In the following detailed description, specific details are set forth in order to provide a thorough understanding of the invention. However, it will be understood by those skilled in the relevant art that the present invention may be practiced without these specific details. In other instances, well-known methods, procedures, components and circuits have not been described in detail so as not to obscure the present invention.

Figure 1:
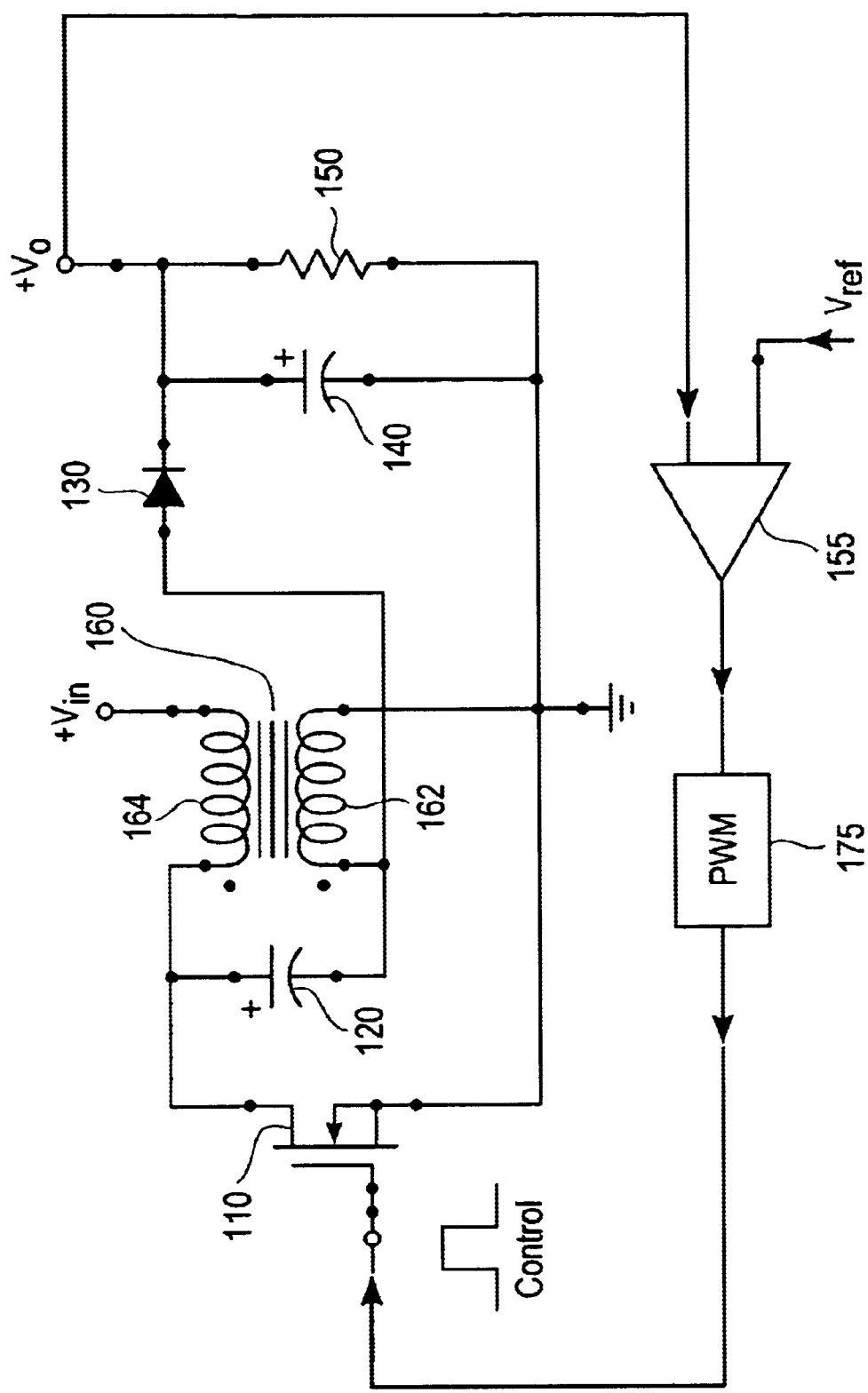
FIG. 1 is a circuit diagram illustrating an embodiment of a DC-to-DC converter in accordance with the present invention.

FIG. 1 is a circuit diagram illustrating an embodiment of a DC-to-DC converter in accordance with the present invention. As illustrated, embodiment 100 includes a transistor 110, a two-coil inductor 160, a diode 130, capacitors 120 and 140, and a load 150 in the form of a resistor in this particular embodiment. Of course, the invention is not restricted in scope to this embodiment. Many variations of this particular circuit would still be within the scope of a DC-to-DC converter in accordance with the present invention. Likewise, although the invention is not limited in scope in this respect, transistor 110 comprises a metal-oxide-semiconductor field effect transistor (MOSFET), and two-coil inductor 160 includes coils 162 and 164, which in this particular embodiment have substantially the same number of windings. Likewise, capacitor 120 comprises a bulk capacitor, whereas capacitor 140 comprises a filter capacitor. In this particular embodiment, input voltage, $V_{IN}$ is applied as illustrated in FIG. 1. $V_{IN}$ is the applied DC voltage to be converted to another DC voltage by DC-to-DC converter embodiment 100. When input voltage $V_{IN}$ is first applied, capacitor 120 charges through the windings of coils 164 and 162 until capacitor 120 charges to voltage $V_{IN}$. Because capacitor 120 couples the corresponding leads of coils 162 and 164 and these coils have substantially the same number of windings, the charging current does not create magnetic flux in the core of inductor 160.

As illustrated in FIG. 1, a control signal pulse is applied to the gate of switching transistor 110. Furthermore, the output voltage may be maintained constant or controlled by changing the duty cycle of the applied control signal pulses. Although the invention is not limited in scope in this respect, as illustrated in FIG. 1, a feedback control mechanism, such as an error amplifier 155 and a pulse-width modulator 175, for example, may be employed to provide this feedback mechanism. Any one of a number of feedback control mechanisms may be employed in accordance with the invention, and the invention is not limited in scope to any particular feedback mechanism, or even to the use of closed loop feedback control. For example, in an alternative embodiment, the control signal pulse may be applied in an open loop circuit and can make the output voltage follow a substantially predetermined pattern. Nonetheless, the application of a control signal pulse to the gate of transistor 110 results in transistor 110 switching on and off. When transistor 110 is on, $V_{IN}$ is applied to coils 162 and 164. This occurs because $V_{IN}$ is applied directly to coil 164 and $V_{IN}$ is applied to coil 162 due to the voltage across capacitor 120 when transistor 110 completes the circuit loop. Once this occurs, inductor 160 begins storing energy.

During the period that transistor 110 is on, diode 130 is reversed biased. This is due to the presence of a negative $V_{IN}$ with respect to ground at the anode of the diode. When transistor 110 turns off, this results in diode 130 conducting current and the voltage across coils 164 and 162 reversing in sign. This occurs because the stored energy in inductor 160 is released in the form of current. With diode 130 conducting, the voltage across coils 164 and 162 is $V_O$ and inductor 160 delivers its stored energy to the load. Therefore, the inductor effectively discharges through capacitor 140 and load resistor 150.

In steady-state operation, during the period of the cycle in which transistor 110 is on, inductor 160 charges or stores current, and, during the period of the cycle in which transistor 110 is off, diode 130 is conducting, and, therefore, inductor 160 discharges or releases its current and delivers it to the load. This cycle is repeated continuously as controlled, at least in part, by the duty cycle of the control voltage pulse applied to the gate of transistor 110.

Figure 2:
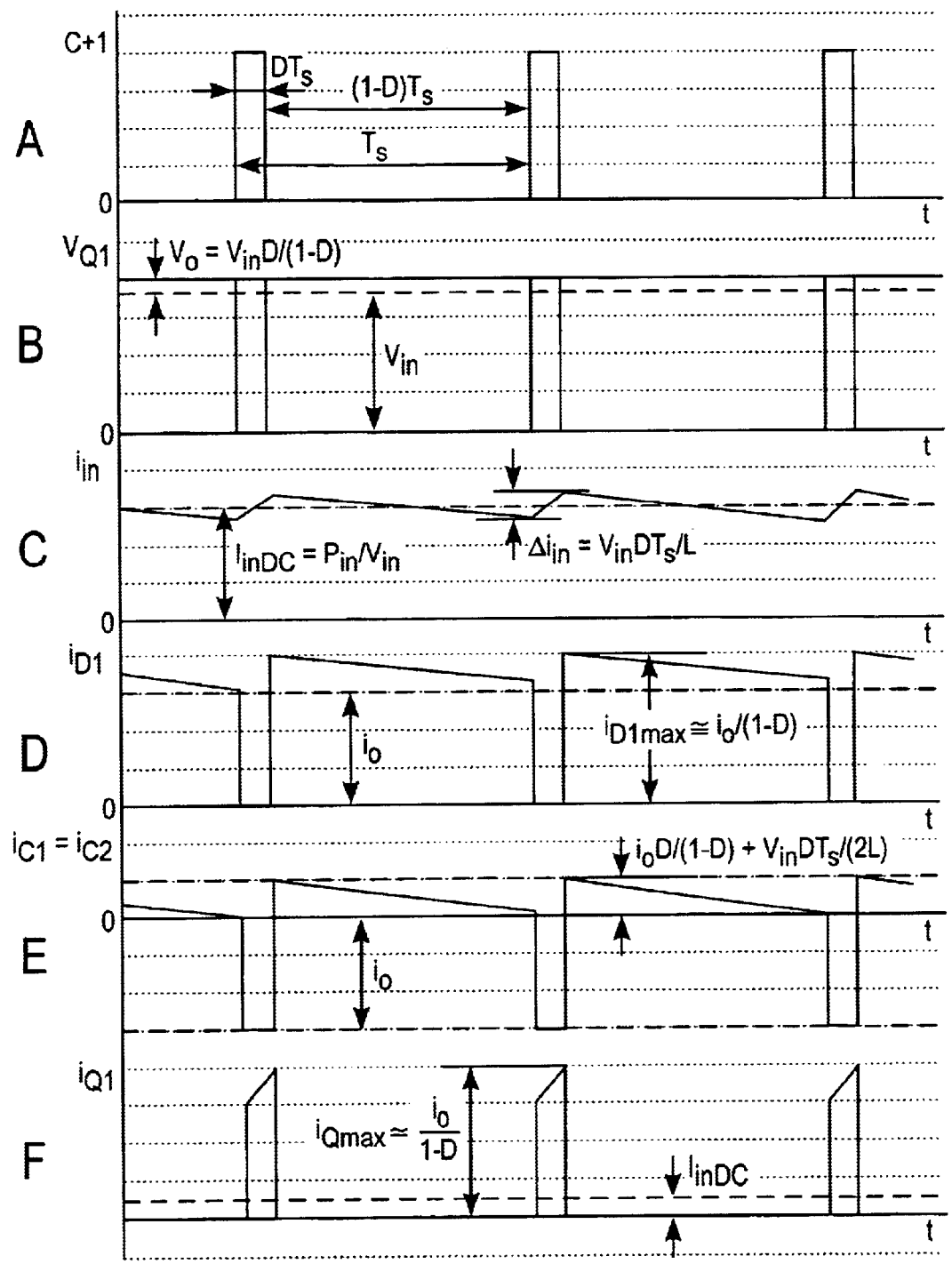
FIG. 2 is a series of timing diagrams illustrating a variety of signals that may be produced by the embodiment of FIG. 1.

As illustrated in FIG. 2, the current through the inductor, designated $I_{IN}$, has a ripple waveform. This is illustrated in FIG. 2C, for example. Because the amount of the ripple varies inversely with the amount of inductance, this ripple may be reduced by increasing the inductance of the inductor employed, such as 160. Likewise, the ripple may be suppressed further by leakage inductance of inductor 160 or by providing an additional inductance in series with one of the coils, such as 164, although, of course, the invention is not limited in scope in this respect.

The relationship between the input voltage and the output voltage may be obtained by equating the current through the inductor for each portion of the cycle and integrating the voltage across coil 162 or 164. This provides the following equation:

$$V_{IN}t_{ON}=(T-t_{ON})V_O,$$

where T is the period of the switching frequency, and $t_{ON}$ is the time duration of the ON state of the switching transistor. Therefore, $$V_O=V_{IN}D/(1-D),$$

where D is the duty cycle and $D=t_{ON}/T$

This relationship between the input voltage and the output voltage is similar to the relationship that occurs for a DC-to-DC converter employing a flyback converter topology where a transformer is employed. However, this relationship is produced in this particular embodiment without employing a transformer. As the equation above illustrates, one advantage of this particular relationship in comparison with other types of non-isolation DC-to-DC converters is that the ratio between the input voltage and the output voltage may be equal, greater than one or less than one, indicating that it is possible to convert from a higher voltage to a lower voltage and from a lower voltage to a higher voltage. For example, if D=0.25, then D/(1−D)=⅓; however, if D=0.75, then D/(1−D)=3. In contrast, many other types of converter topologies or configurations, such as a buck converter or a boost converter, for example, are limited in that it is not possible to have a ratio capable of being both greater than one or less than one, depending on the duty cycle.

As the previous discussion illustrates, this particular embodiment of a DC-to-DC converter includes a circuit topology such that a magnitude of a ratio of the input signal to the output signal of the DC-to-DC converter is capable of being greater than one or less than one. Furthermore, the same capacitor, capacitor 120 in FIG. 1, in this particular embodiment, is employed in both a primary and a secondary circuit loop of the DC-to-DC converter. It is, of course, appreciated that, although this particular embodiment employs one capacitor in this fashion, the invention is not limited in scope in this respect, and more than one capacitor may be employed in this fashion.

In contrast with a flyback converter, for example, the primary and secondary loops are not electrically isolated, as would occur where a transformer is employed. It is not necessary to provide low leakage inductance (i.e. good coupling) between primary and secondary coils. Therefore, one advantage of this particular embodiment is a less expensive component, such as inductor 160 in FIG. 1, may be employed instead of a transformer. Another advantage of this particular embodiment is that the polarity of the output voltage signal is the same as the polarity of the input voltage signal. In alternative DC-to-DC converters, frequently the polarity of the output signal is opposite the polarity of the input signal.

A feature of the topology for the embodiment illustrated in FIG. 1 is that capacitor 120 couples first and second coils 164 and 162. One advantage of employing a capacitor that couples the first and second coils is that it effectively clamps input voltage spikes that may appear due to a leakage inductance or inductance in series with the first coil. However, this embodiment accomplishes this clamping without dissipating energy, as would occur if an RC circuit, that is, a resistor-capacitor configuration, were employed, such as is often employed to dampen voltage spikes. Furthermore, in this particular embodiment, employing a relatively sizable bulk capacitor for capacitor 120 clamps voltage spikes because the voltage across the low ESR (equivalent series resistance) capacitor typically does not change instantly. Furthermore, the larger the capacitance value, the more energy it is capable of absorbing. Thus, a spike may be reduced to any desired level in relation to the amount of capacitance. In this particular embodiment, if the voltage spike is so large that the drain-to-source voltage across transistor 110 is larger than the sum of the input voltage and the output voltage, diode 130 will begin conducting, which will further clamp a present voltage spike because conduction of diode 130 will form a circuit loop that includes capacitors 120 and 140.

FIGS. 2A to 2F are timing diagrams illustrating waveforms for various signals produced by embodiment 100. FIG. 2A illustrates the control signal pulse applied to the gate of transistor 110. As illustrated in FIG. 2A, $T_S$ is assumed to be the period of the switching frequency, whereas D is the duty cycle. D is between zero and one in this embodiment (0<D<1). FIG. 2B illustrates the voltage across transistor 110. When the control signal pulse is applied to the gate of 110, the voltage across the transistor is close to zero volts. However, when the control signal pulse is not applied to the gate and the transistor is off, the voltage across the transistor is the sum of $V_{IN}$ and $V_O$. In this example, $V_O$ is less than $V_{IN}$, although the invention is not limited in scope to this particular situation. As previously described, $V_O$ may be equal, less than or greater than $V_{IN}$. FIG. 2C illustrates the current through coil 164 of inductor 160. As previously described, this waveform has a ripple. The change in current, as illustrated in FIG. 2C, may be computed based on the integral of $V_{IN}$, which provides the expression shown in the figure. FIG. 2D and FIG. 2F illustrate the currents through the output diode 130 and switching transistor 110 respectively. Therefore, FIG. 2F illustrates the current pulses formed while the inductor is charging or storing current, whereas FIG. 2D illustrates the current pulses formed when the stored inductor current is being discharged and applied to the load.

Figure 3:
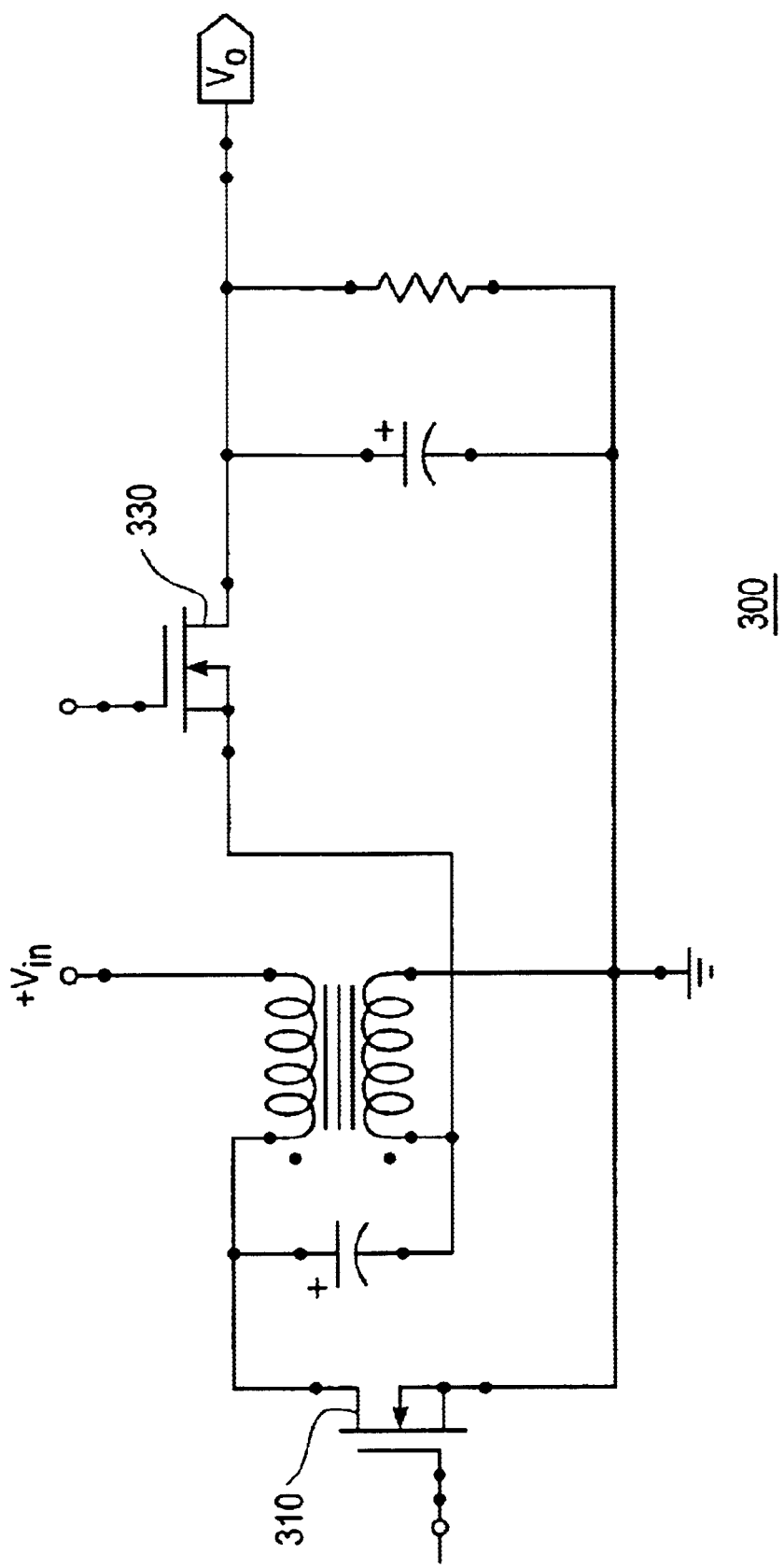
FIG. 3 is a circuit diagram illustrating another embodiment of a DC-to-DC converter in accordance with the present invention.

Of course, the invention is not restricted in scope to this embodiment and instead of a diode, such as 130 in FIG. 1, in order to increase efficiency, a synchronous rectifying MOSFET, for example, may be used, as illustrated by embodiment 300 shown in FIG. 3. Again, the invention is not restricted in scope to this particular embodiment. Furthermore, embodiment 300 operates in a manner similar to that described with respect to embodiment 100 shown in FIG. 1, with a few differences. Specifically, a control pulse is applied to switch MOSFET 330 on and off similar to the manner applied to MOSFET 110 in FIG. 1, as previously described. The control pulses enabling synchronous rectifying MOSFET 330 should be formed after the switching transistor 310 is turned off. Furthermore, synchronous rectifying MOSFET 330 should be turned off before switching transistor 310 is turned on, etc. The dead time between switching edges of these transistors is employed to prevent cross-conduction power losses. One reason a synchronous rectifier embodiment, such as illustrated in FIG. 3, for example, may provide improved efficiency in comparison, for example, with the embodiment illustrated in FIG. 1, is because the voltage drop across MOSFET 330 can be made lower than that across diode 130, and, therefore, less power is dissipated during circuit operation.

An embodiment of a method of converting from an input direct current (DC) voltage, $V_{IN}$, to an output direct current (DC) voltage, $V_O$ in accordance with the invention, where $V_{IN}$ and $V_O$ have the same polarity, is as follows. Current is conducted through a primary and a secondary loop circuit at different times so as to charge and discharge an inductor in both circuit loops. For example, the circuits shown in FIGS. 1 and 3 may be employed to implement this method embodiment, although the invention is not limited in scope to employing the method embodiment in these particular circuit embodiments, of course. While the inductor charges, the voltage across its coils is $V_{IN}$ and while the inductor discharges, the voltage across its coils is $V_O$. In this particular embodiment, the inductor comprises a two-coil inductor where one of the coils is in the primary circuit loop and the other coil is in the secondary circuit loop, although the primary and secondary circuit loops are not electrically isolated. Furthermore, in this particular embodiment, the current is conducted through the primary and secondary circuit loops in accordance with a duty cycle, such as D. Likewise, the duty cycle may be modified. In one embodiment, the duty cycle may be modified based, at least in part, on the output voltage. Again, this approach is illustrated by the embodiment shown in FIG. 1. Alternatively, the duty cycle may be modified based, at least in part, on the control voltage signal. For example, a control voltage signal may be applied to a pulse width modulator that applies a voltage to the gate of a switching transistor, such as transistor 110 in FIG. 1, for example. Likewise, in a particular embodiment, voltage spikes may be clamped across the inductor as current conducts through the primary circuit loop. Of course, the invention is not restricted in scope to these particular embodiments.

While certain features of the invention have been illustrated and described herein, many modifications, substitutions, changes and equivalents thereof will now occur to those skilled in the art. It is, therefore, to be understood that the appended claims are intended to cover all such modifications and changes as fall within the true spirit of the invention.

What is claimed is:

1. A DC-to-DC converter having an input voltage and an output voltage, comprising:
   a circuit topology such that, in operation, the input and output voltages have the same polarity, and that a magnitude of a ratio of the input voltage to the output voltage of said DC-to-DC converter is capable of being equal to, greater than, or less than one;
   said circuit topology being further such that at least one capacitor and alternative coils of a two-coil inductor are employed in a primary and a secondary circuit loop of said DC-to-DC converter;
   said primary and secondary circuit loops not being electrically isolated.

2. The DC-to-DC converter of claim 1, wherein said primary circuit loop includes an inductance in series with one of the coils of said two-coil inductor.

3. The DC-to-DC converter of claim 1, wherein the first and the second coil of the two-coil inductor includes substantially the same number of windings on each coil.

4. The DC-to-DC converter of claim 1, wherein the same at least one capacitor couples between the first and second coils.

5. The DC-to-DC converter of claim 4, wherein the same at least one capacitor is coupled in said circuit topology so as to clamp voltage spikes during circuit operation.

6. The DC-to-DC converter of claim 1, wherein said primary circuit loop includes an electronic switch.

7. The DC-to-DC converter of claim 6, wherein said electronic switch comprises a transistor.

8. The DC-to-DC converter of claim 7, wherein said transistor comprises a metal-oxide-semiconductor field effect transistor (MOSFET).

9. The DC-to-DC converter of claim 6, wherein said secondary circuit loop includes an electronic switch.

10. The DC-to-DC converter of claim 9, wherein said circuit topology is such that, during operation, said two-coil inductor charges during current flow through said primary circuit loop and discharges during current flow through said secondary circuit loop.

11. The DC-to-DC converter of claim 9, wherein said electronic switch in said secondary circuit loop comprises a diode.

12. The DC-to-DC converter of claim 11, wherein said secondary circuit loop further includes a capacitor coupled to clamp voltage spikes if the voltage across said electronic switch in said primary circuit loop exceeds the sum of the input voltage and the output voltage.

13. The DC-to-DC converter of claim 9, wherein said DC-to-DC converter comprises a synchronous rectifying DC-to-DC converter, wherein said electronic switches in said primary circuit and said secondary circuit loops each comprise a transistor.

14. The DC-to-DC converter of claim 13, wherein said transistors comprise metal-oxide-semiconductor field effect transistors (MOSFETs).

15. The DC-to-DC converter of claim 6, further including a feedback loop to drive said electronic switch in said primary circuit loop.

16. The DC-to-DC converter of claim 15, wherein said feedback loop is coupled so that a pulse having a duty cycle drives said electronic switch; said feedback loop being further adapted to modify the duty cycle of said drive pulse.

17. The DC-to-DC converter of claim 16, wherein said feedback loop is adapted to modify said duty cycle based, at least in part, on said output voltage signal.

18. The DC-to-DC converter of claim 17, wherein said feedback loop includes a pulse width modulator.

19. A circuit for converting from an input direct current (DC) voltage, $V_{IN}$, to an output direct current (DC) voltage, $V_O$, $V_O$ and $V_{IN}$ having the same polarity, said circuit comprising:

an inductor coupled so as to have a primary loop circuit and a secondary loop circuit that respectively conduct current at different times during circuit operation;

wherein said primary and secondary loop circuits are not electrically isolated;

wherein said primary loop and secondary loop circuits are further coupled so that, during circuit operation, while said inductor is charging via current flow in said primary loop circuit, the voltage across the coils of said inductor is $V_{IN}$, and while said inductor is discharging via current flow in said secondary loop circuit, the voltage across the coils of said inductor is $V_O$.

20. The circuit of claim 19, wherein said inductor comprises a two-coil inductor.

21. The circuit of claim 19, wherein a capacitor is included in said primary circuit loop and said secondary circuit loop.

22. The circuit of claim 19, wherein said primary circuit loop includes an electronic switch that is coupled to be driven by a voltage pulse having a duty cycle.

23. The circuit of claim 22, and further comprising a feedback loop to modify the duty cycle of said voltage pulse driving said electronic switch.

24. The circuit of claim 23, wherein said electronic circuit comprises a transistor.

25. The circuit of claim 24, wherein said transistor comprises a metal-oxide-semiconductor field effect transistor (MOSFET).

* * * * *